Figure 1:
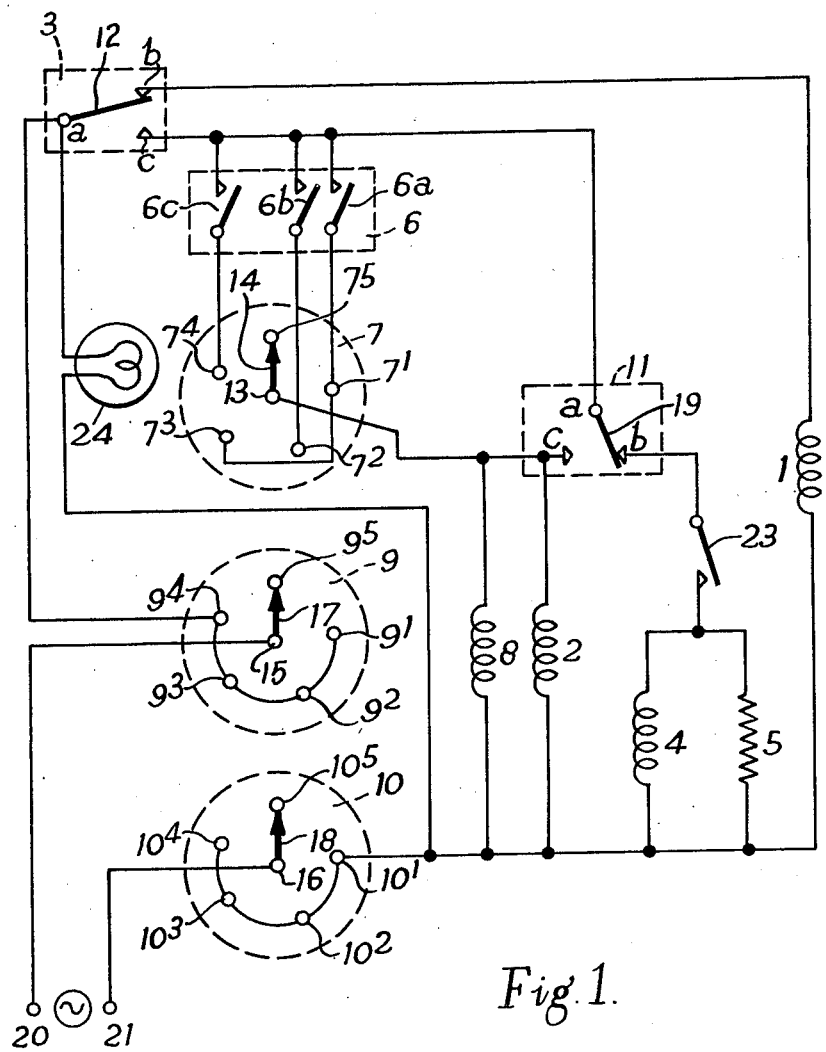

July 13, 1965 J. M. D. DELAPENA 3,194,250
CONTROL CIRCUIT FOR A DISHWASHING MACHINE
Filed Dec. 3, 1963 2 Sheets-Sheet 2

United States Patent Office 3,194,250
Patented July 13, 1965

3,194,250
CONTROL CIRCUIT FOR A DISHWASHING MACHINE
John Michael Devereux Delapena, London, England, assignor to Porlester Limited, Leicestershire, England, a British company
Filed Dec. 3, 1963, Ser. No. 327,697
Claims priority, application Great Britain, Dec. 5, 1962, 46,009/62
4 Claims. (Cl. 134—57)

This invention relates to washing machines, that is to say dish washing machines and clothes washing machines. By the term "dish washing machine" is meant a machine for washing dishes, plates and like table-ware, cutlery, cooking vessels and utensils. By the term "clothes washing machine" is meant a machine for washing clothes, soft furnishings and the like.

The invention is concerned with a washing machine of the form comprising, in combination, a casing for housing articles to be washed and including a tank for holding water, an inlet valve for controlling admission of water to the tank, an outlet valve for controlling the egress of water from the tank, a pump or agitator, as the case may be, for circulating or agitating water within the machine and arranged to be driven by a prime mover, e.g. a motor, which is adapted to be electrically controlled, and a heater for heating water in the tank and operable at the same time as the pump or agitator.

In a clothes washing machine the said tank is of substantial size and the clothes are immersed in the water therein which is agitated by the agitator. In a dish washing machine the said tank constitutes a sump, the dishes are housed within the casing but outside the sump and the pump is arranged to pump water from the sump and to direct water, for example through a spray tube, over the dishes, the water then returning to the sump for recirculation.

The object of the invention is to provide a washing machine having a simple yet efficient control system for automatically controlling the sequence of operations of the machine.

Thus, the broad aim of the invention is to provide an automatically operable washing machine of simple construction employing a minimum number of components and which can be easily and economically produced and yet is efficient in operation.

In accordance with the present invention there is provided a washing machine of the form concerned having a control system comprising, in combination, electrically-controlled means for actuating the inlet and outlet valves, switch means adapted to detect the level of water in the tank, at least one thermostat responsive to temperature within the casing of the machine, a multi-position electrical switch in circuit with said thermostat, electrically controlled means for automatically moving the switch from one position to the next position, all of said means being connected together in circuit, the arrangement being such that, in operation, water is admitted to the tank and, when it has reached a predetermined level, the heater and the pump motor or agitator are brought into and remain in operation until such time as the temperature within the casing of the machine attains a predetermined value when the motor driving the pump or agitator and the heater are automatically switched off and the outlet valve is actuated to drain the water from the machine.

Thus, the idea of the present invention is that the duration of the washing cycle, or each of a plurality of stages in the washing cycle, is determined by the temperature attained, in contra-distinction to conventional control systems in which timing devices are provided and hence the duration of the washing cycle, or each stage thereof, is determined by time. Control by temperature has the advantages that the predetermined temperature or temperatures is or are attained irrespective of climatic conditions and also that the complex and expensive timing devices hitherto provided are eliminated.

Advantageously, the control system is such that a washing cycle comprises a plurality of stages, in each of which fresh water enters the tank, is heated and circulated and drained from the tank when the relevant predetermined temperature has been attained. The arrangement could be such that the same maximum temperature is attained during each stage of the cycle. That is to say, each stage is terminated when the same predetermined temperature is attained. Advantageously, however, the arrangement is such that the maximum temperature attained during some of the various stages of a cycle are different although the same temperature may be attained in two stages. Preferably, the temperatures attained during succeeding stages are progressively increased so that the maximum temperature of the cycle is attained during the final stage. In this event, the aforesaid thermostat is conveniently a multi-stage thermostat having pairs of contacts operable at the predetermined temperatures, these pairs of contacts being brought selectively into operation by the automatic movement of the multi-position switch.

The said means for actuating the inlet and outlet valves may each comprise a solenoid.

The aforesaid switch means adapted to detect the level of water in the tank is preferably a pressure-responsive switch but could be a float operated switch. In any event, the water level responsive switch means advantageously has associated therewith a differential mechanism whereby the switch means will be set in one condition when there is a predetermined level of water in the tank but will not be set in its other condition until all or substantially all of the water which is to be drained is drained from the tank and, during supply of the water, the switch will not be re-set to the first-mentioned condition until the water has attained the predetermined level. It is to be noted that there may be a small quantity of water in the sump which is not drained after each stage.

The said heater for heating the water is preferably an electrical heater although it could be gas fired and under electrical control.

The multi-position switch is advantageously a rotary switch having a series of fixed contacts and a movable contact which can be indexed to its various positions to selectively contact the fixed contacts.

The means for moving the rotary switch from one position to the next position conveniently comprise a ratchet wheel having a plurality of peripheral indentations corresponding to the number of switch positions and turnable with the movable contact of the switch, a pawl for engagement in the peripheral indentations of the ratchet wheel, the pawl being spring urged in the direction in which the switch is to be indexed, and a solenoid with a movable core coupled to the pawl, whereby when the solenoid is energised to move the pawl in one direction and is then de-energised, the pawl moves the ratchet wheel and the switch from one position to the next position.

In any event, the rotary switch conveniently has an overriding manual control whereby it can be moved manually not only to an initial position but also selectively to any of its other positions.

Figure 2:
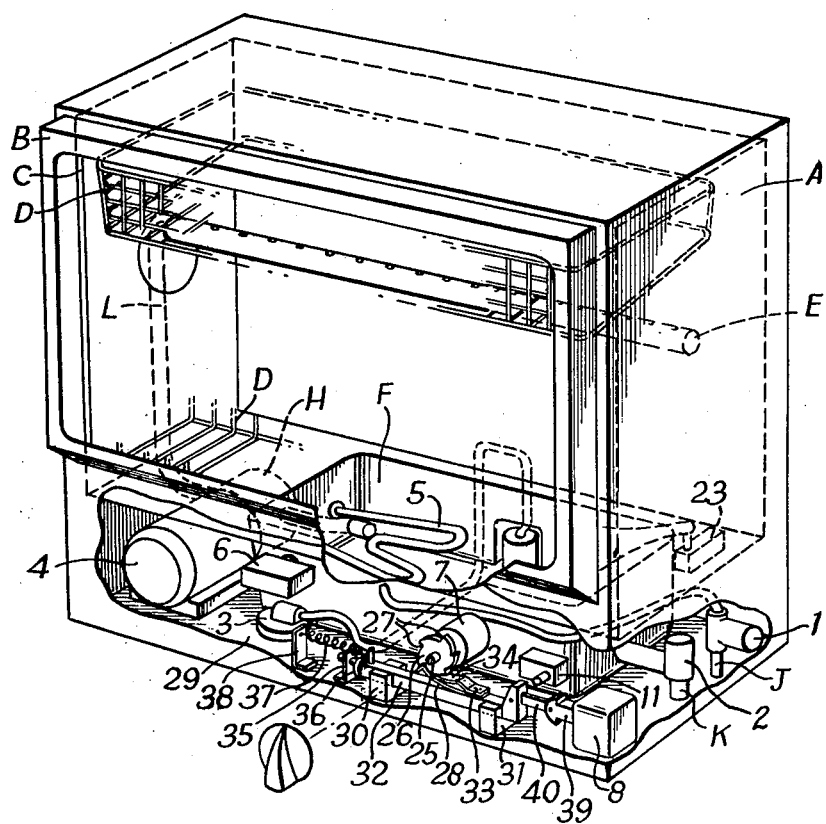

In order that the invention may be more clearly understood one specific embodiment thereof in the form of a dish-washing machine will now be described with reference to the accompanying drawings, wherein:

FIGURE 1 is a diagrammatic perspective view of the complete machine with parts broken away; and FIGURE 2 is a diagram of the electrical circuit of the control system.

The dish washing machine of this example may comprise a generally rectangular casing or cabinet A adapted to be well mounted or provided with feet for standing on a floor or table, the cabinet having a door B which may be at least partially transparent forming the front side which is hinged along its lower edge so as to open as a flap. The door edges and the co-operating edges of the cabinet are provided with means C for sealing the cabinet A against egress of water and also channels for collecting and guiding any unintended leakage water from the vicinity of the door seal back to the machine sump.

Within the cabinet, are arranged suitable racks D for receiving plates, cups, saucers and the like and other eating and cooking utensils. Between these racks, extending the length of the cabinet, is a perforated water pipe or spray tube E for spraying water downwardly and upwardly over the racks. Below the racks is a water sump F, having a capacity of, for example, one gallon, and a compartment containing a water pump H, a motor 4 for driving the latter and the various components forming the control system of the machine. Provision is made for connecting an external water supply to a normally-closed valve J which can be opened by an associated solenoid and for conveying away waste water expelled through a normally-closed valve K which can also be opened by an associated solenoid. Provision is also made for connecting an electricity supply to the machine. The pump H is connected to the spray tube E by a pipe L so that water can be pumped from the sump to the spray tube.

Referring to FIGURE 1, the principal components used in the control circuit are a solenoid designated 1 for controlling the aforesaid water inlet valve J, a solenoid 2 for controlling the water outlet valve K, a switch 3 responsive to the level of the water in the sump, a motor 4 for driving the aforesaid pump, a heater 5 which is located in the sump, a thermostat 6 which is located at any convenient location within the cabinet of the machine (i.e. within the sump or elsewhere), a multi-position switch 7, a solenoid means 8 for automatically moving the latter from one position to another, switches 9 and 10 and a micro-switch 11.

The switch 3 is a pressure responsive alternative pole switch the movable contact 12 thereof being arranged to connect either contact $b$ or contact $c$ thereof with the common terminal $a$. The switch 3 has associated therewith a differential mechanism of known form whereby, when the switch is subjected to a predetermined pressure, by a predetermined level of water in the sump, the contact $c$ is connected with terminal $a$, when the water begins to drain from the sump the switch 3 is not immediately actuated but is only actuated when practically all of the water has been drained, at which time the contact 12 is moved to contact the contact $b$. There is a similar delay in operation of the switch 3 during supply of water to the sump, the switch only being actuated when the water has attained the predetetermined level.

The thermostat 6 is a three-stage thermostat, that is to say comprises three pairs of normally open contacts designated respectively 6a, 6b and 6c which are adapted to be closed at different temperatures, viz. approximately 95° F., approximately 135° F. and approximately 180° F. respectively. Thus, these pairs of contacts are adapted to be closed when the relevant temperature is attained or exceeded, the three pairs of contacts in fact constituting three thermostats.

The multi-position switch 7 is, as will be hereinafter described, a rotary switch which can be indexed to five alternative positions and comprises a fixed circular series of five equi-spaced and independent contacts $7^1$, $7^2$, $7^3$, $7^4$ and $7^5$, a common terminal 13 and an associated rotatable contact 14. Thus, in each of its five positions the movable switch contact 14 connects the relevant fixed contact with the common terminal 13. As will be seen, the thermostat contacts 6a are connected to the contact $7^1$, the thermostat contacts 6b are connected to the contact $7^2$, the thermostat contacts 6c are connected to the contact $7^4$, whilst the contact $7^3$ is connected by an internal link to the contact $7^1$ and is thereby also connected to the thermostat contacts 6a. The contact $7^5$ is not connected in circuit and constitutes an "off" or "open-circuit" position. The solenoid means 8 for indexing the switch to its alternative positions will be described in more detail below but it is to be noted that the arrangement is such that when the solenoid 8 is de-energised the switch 7 is indexed from one position to the next adjacent position.

Ganged with the rotary switch 7, e.g. mounted upon a common spindle, are two switches 9 and 10 which are adapted to maintain the power supply except when the contact 14 of switch 7 is turned to the position $7^5$ when the switches 9 and 10 provide open circuit and disconnect the supply. These switches are illustrated for a clear understanding of the arrangement as further two multi-position switches each having five contacts $9^1$, $9^2$, $9^3$, $9^4$ and $9^5$ and $10^1$, $10^2$, $10^3$, $10^4$ and $10^5$ respectively and each having a common terminal 15, 16 and an associated rotary contact 17 and 18 which is turnable with the contact 14 of switch 7. The contacts $9^1$ to $9^4$ of switch 9 are connected together by an internal connection while the contacts $10^1$ to $10^4$ are similarly connected together by an internal connection, the contacts $9^5$ and $10^5$ providing "off" or "open-circuit" positions.

The micro-switch 11 is an alternative pole switch, the movable contact 19 of which is adapted to connect either the contact $b$ or the contact $c$ with a common terminal $a$. This switch 11 is mechanically coupled to the solenoid 8 such that, whenever the solenoid is de-energised, the contact 19 is moved to the position in which the contact $c$ is connected to terminal $a$. Mains terminals 20 and 21 are provided to which an alternating mains current is supplied, the terminal 20 being designated the phase terminal and the terminal 21 being designated the neutral terminal.

As will be seen, the phase line from terminal 20 is connected via the switch 9 to the terminal $a$ of switch 3 while the neutral line is connected to the terminal 12 via the switch 10 this latter terminal being common to the contacts $10^1$ to $10^4$. The solenoid for operating the inlet water valve is connected at one side to the neutral line and at the other side to the contact $b$ of switch 3. The heater 5 is connected in parallel with the pump motor 4 which is connected at one side to the neutral line and connected at the other side, in series with an on/off micro-switch 23 (which is controlled by the door of the machine such that the contacts are closed whenever the door is closed), and through one pole, viz, contact $b$, of micro-switch 11, to contact $c$ of switch 3. The solenoid 2 for controlling the water outlet valve is connected at one side to the neutral line and at the other side to contact $c$ of micro-switch 11. The solenoid means 8 for indexing the switch 7 are connected in parallel with the solenoid 2. Also connected to the contact $c$ of switch 11 is a lead from the common terminal 13 of switch 7. The contacts $7^1$ to $7^4$ are connected to the thermostat contacts 6a, 6b and 6c as previously described and the latter have a common connection at the other side to contact $c$ of switch 3. Connected between the neutral terminal 21 and the terminal $a$ of switch 3 is an electric lamp 24, e.g. of neon type.

The machine of this example is adapted to automatically execute a four-stage washing cycle, as follows:

*First stage.*—A pre-wash rinse with a supply of fresh water which is circulated and heated to a moderate temperature and does not contain detergent or the like, and egress of this water.

*Second stage.*—Washing with a supply of fresh water containing detergent or the like and which is circulated and progressively heated to a somewhat higher temperature than the maximum temperature attained during the first stage and egress of this water.

*Third stage.*—A first post-wash rinse with a supply of fresh water which is circulated and heated to the same temperature as the maximum temperature attained during the first stage and egress of this water.

*Fourth stage.*—A second post-wash rinse with a supply of fresh water, optionally containing a rinse-aid, which is circulated and heated to a higher temperature than attained during the preceding stages, egress of this water and switching off of the machine.

The operation of the circuit to effect this complete cycle of operation of the machine is as follows:

After the machine has been loaded with dishes to be washed the door is closed thereby closing door microswitch 23. Initially, the switch 7 is in its "off" position with its movable contact 14 contacting the contact $7^5$. Accordingly, the switches 9 and 10 are also in their "off" positions the contact 17 and 18 contacting the contacts $9^5$ and $10^5$.

The movable contact 14 of switch 7 is then moved manually to the first position contacting the contact $7^1$. The movable contact 17 and 18 of switches 9 and 10 will be similarly moved to the first positions contacting contacts $9^1$ and $10^1$ thus providing continuity therethrough thereby bringing the lamp 24 into operation to indicate that the power is being supplied to the circuit and energising the solenoid means 1 thereby to open the water inlet valve. Cold water then enters the sump of the machine. When the water attains a predetermined level the pressure thereof acting upon the pressure switch 3 will move the contact 12 thereof from the contact $b$ to the contact $c$ thereby de-energising the solenoid 1 and connecting the thermostat 6 and the terminal $a$ of switch 11 to the phase line of the supply. At this stage the movable contact 19 of the switch 11 is in contact with the contact $b$. Thus, the initially cold water commences to be heated and is supplied to the spray tube and is sprayed onto the dishes, falls into the sump and is recirculated, e.g. through a suitable filter (not shown).

When the temperature within the machine reaches 95° F., that is to say when the water or the ambient temperature within the machine, depending upon the location of the thermostat, attains this temperature the thermostat contacts 6a close hereby connecting the solenoid 2 actuating the water outlet valve to the supply so that the water commences to drain from the machine. At the same time the solenoid 8 is connected to the phase line thereby energising the latter. The movable contact 19 of switch 11 is accordingly moved from contact $b$ to contact $c$ thereof thus disconnecting the supply to the pump motor 4 and the heater 5 and completing a holding circuit for the solenoid 8. Thus the first stage of the cycle is terminated and the second stage commences immediately.

When practically all of the water has drained from the sump pressure upon the switch 3 will be relieved and the movable contact 12 will be moved from the contact $c$ to the contact $b$. This will de-energise the solenoid 2 to close the drain valve and de-energise the solenoid 8 so that the movable contact 14 of the switch 7, and also the movable contacts 17 and 18 of the switches 9 and 10 will be moved to their second positions $7^2$, $9^2$, and $10^2$. At the same time solenoid 1 is re-energised so that fresh water will enter the sump. Thus, the open thermostat contacts 6b have now been connected in circuit. At the same time, the contact 19 of switch 11 will be moved from the contact $c$ to the contact $b$ thereof. When the level of water in the sump again attains the predetermined level switch 3 will again be actuated movable contact 12 thereof being moved from contact $b$ to contact $c$ to de-energise solenoid 1 and terminate the supply of water and restore the power supply to the pump motor 4 and heater element 5. Thus, the fresh water is heated and circulated. When the temperature within the machine reaches 135° F. the second stage of the cycle is terminated and the third stage commences. Thus, the thermostat contacts 6b close thereby connecting the solenoid 2 actuating the water outlet valve so that the water drains from the machine.

The third stage of the cycle proceeds in similar fashion to the second stage, switches 7, 9 and 10 being indexed to their third positions to bring thermostat contacts 6a into circuit again, fresh water entering the machine and being heated and circulated until the temperature within the machine again reaches 95° F. at the end of the third stage and commencement of the fourth stage. Thus, the thermostat contacts 6a close thereby connecting the solenoid means 2 actuating the water outlet valve so that the water drains from the machine.

The fourth stage proceeds in similar fashion to the preceding stages, switches 7, 9 and 10 being indexed to their fourth positions to bring the thermostat contacts 6c into circuit, fresh water entering the machine and being heated and circulated until the temperature within the machine reaches 180° F. when the thermostat contacts 6c close thereby connecting the solenoid 2 actuating the water outlet valve so that the water drains from the machine. The switches 7, 9 and 10 will then be moved to their fifth, i.e. "off" positions. In these positions the supply to the circuit is interrupted by the switches 9 and 10 so that the whole control circuit is de-energised. The lamp 24 is extinguished to indicate this condition of the machine.

The means for indexing the switch 7 will now be described in more detail with reference to FIGURE 2. In this figure the spindle of the switch 7 carrying the movable contact 14 of the switch (and also the movable contacts 17 and 18 of the switches 9 and 10) is designated 25 while the solenoid is designated 8. Provided upon the spindle 25 is a ratchet wheel 26 formed at regularly spaced intervals therearound with five identical peripheral indentations 27 each corresponding to one of the positions of the switch 7. A spring element 28 constitutes an indexing finger which is suitably supported for movement and controlled by the solenoid 8 for engaging the indentations 27 and indexing wheel 26 and hence the movable contacts of the switches 6, 9 and 10.

The complete switch actuating mechanism is mounted upon a rigid base 29 upon which are mounted at respectively opposite sides of the axis of the spindle 25 two bearing blocks 30, 31 of nylon or equivalent material which are each formed with a slot. Mounted for longitudinal movement in the slots of the blocks 30, 31 is an elongated member 32 to which the indexing element 28 is secured by two screws 33. The latter also secure a backing element 34 for limiting deflection of the indexing element 28. Located adjacent the block 30 is a bracket 35 which supports an adjusting screw 36 the axis of which is in longitudinal alignment with the member 32. The arrangement is such that movement of the member 32 to the left as viewed in the drawing, is limited by the screw 36 which can be adjusted to vary the left hand position of the member 32. A tension spring 37 is interposed between an anchorage 38 upon the base 29 and the relevant end of the member 32 suchwise as to normally urge the latter into contact with the screw 36. Thus, the spring 37 is adapted to urge the indexing element 28 in the direction in which the switch 7 is to be indexed. Articulated between the opposite end of the member 32 and the movable core 39 of the solenoid 8 is a link 40.

Normally the member 32 is located in the left hand position with the indexing element 28 located adjacent one of the indentations 27. When the solenoid 8 is energised the member 32 is moved to the right to bring the indexing element 28 behind and into engagement with the next adjacent indentation 27. Upon de-energisation of the solenoid 8 the member 32 will be moved to the left as viewed in the drawing under the action of the tension spring 37 whereby the ratchet wheel 26 will be turned through ⅕ of a revolution whereby the switches 7, 9 and 10 are moved from one position to the next adjacent position.

It is to be noted that the switch 7 is only actuated when carrying no current thus eliminating wear of contacts due to sparking.

The spindle 25 of the switch 7 is furnished with a knob operable from outside the machine with the door closed whereby the switch can be moved from position $7^5$ to position $7^1$ to initiate a new cycle. This also provides an over-riding manual control of the switch 7 whereby the latter can be set to any desired position to vary the cycle, i.e. to initiate or terminate the cycle at a different stage.

I claim:

1. A dish-washing machine comprising a casing for housing articles to be washed and including a sump for holding water, an inlet valve for controlling admission of water to the sump, an outlet valve for controlling the egress of water from the sump, a pump for circulating water within the machine and arranged to be driven by a motor, a heater for heating water in the sump and an electrical control system for automatically controlling the cycle of operation of the machine, adapted to be connected to first and second electricity supply line poles and comprising, in combination, a first alternative pole switch responsive to the level of water in the sump and connected at the common pole side to said first pole of the electricity supply line; a solenoid, for operating said water inlet valve, interposed between said first pole of said water level responsive switch and the second pole of the electricity supply line; a multi-position rotary switch having a plurality of fixed contacts, a common terminal and a movable contact for selectively connecting said fixed contacts to the terminal, one position of the switch providing open circuit, the said rotary switch having a ratchet wheel formed with a plurality of peripheral indentations corresponding to the number of positions of the rotary switch and turnable with the movable contact thereof, an indexing element adapted to engage said indentations and a spring adapted to urge said indexing element in the direction in which the switch is to be indexed, a switch actuating solenoid having a movable core connected to said indexing element and adapted, when energised, to move the indexing element against the action of the spring into engagement with the next adjacent indentation and when deenergised to allow the pawl to move under the action of the spring to index the rotary switch from one position to the next position, said switch actuating solenoid being connected between the said common terminal of the rotary switch and said second electricity supply line pole; a thermostat having a plurality of normally open switch contacts adapted to close at respectively different temperatures and having the common connection at one side to the second pole of said water level responsive switch and connected at their other sides to respective ones of said fixed contacts of said rotary switch, a normally closed switch connected to said first pole of the electricity supply line, a normally closed switch connected to said second pole of the electricity supply line, said normally closed switches being so coupled to said rotary switch that, in the open circuit position of the latter, said switches are also at open circuit, a solenoid, for operating the water inlet valve, in parallel with said switch-actuating solenoid, a second alternative pole switch controlled by said switch-actuating solenoid and connected at the common pole side to the said second pole of the water level responsive switch, said motor being interposed between a first pole of said second alternative pole switch and said second electricity supply line pole via a switch the contacts of which are closed when the door of the machine is closed and open when the door is open, said heater being connected in parallel with said motor, the circuit through said second alternative pole switch normally providing continuity to the first pole thereof and being open to the second pole thereof but upon energisation of the switch-actuating solenoid the first pole thereof is at open circuit and the second pole thereof is closed to complete a holding circuit for the switch-actuating solenoid; the arrangement being such that, in operation, the machine is controlled by said control system to automatically execute a washing cycle comprising a plurality of stages, in each of which fresh water is admitted to the sump and when it attains a predetermined level the heater and the motor are brought into operation until the temperature within the casing of the machine attains the predetermined value for that stage, when the relevant pair of thermostat switch contacts are closed, the motor and the heater are switched off and the outlet valve is actuated to drain the water from the machine and the multi-position switch is moved to its next position to initiate the next stage of the cycle.

2. A washing machine according to claim 1, wherein the rotary switch has an overriding manual control whereby it can be moved manually not only to an initial position but also to any of its other positions.

3. A washing machine according to claim 1 which includes an electrical indicator lamp which is in operation whenever electrical power is being supplied to the circuit.

4. A dish-washing machine comprising a casing for housing articles to be washed and including a sump for holding water, an inlet valve for controlling admission of water to the sump, an outlet valve for controlling the egress of water from the sump, a pump for circulating water within the machine and arranged to be driven by a motor, a heater for heating water in the sump and an electrical control system for automatically controlling the cycle of operation of the machine, adapted to be connected to an electricity supply and comprising, in combination, a first alternative pole switch responsive to the level of water in the sump; a solenoid for operating said water inlet valve, a solenoid, for operating said water outlet valve, a multi-position rotary switch having a plurality of fixed contacts, a common terminal and a movable contact for selectively connecting said fixed contacts to the terminal, one position of the switch providing open circuit, the said rotary switch having a ratchet wheel formed with a plurality of peripheral indentations corresponding to the number of positions of the rotary switch and turnable with the movable contact thereof, an indexing element adapted to engage said indentations, a switch-actuating solenoid having a movable core connected to said indexing element and adapted, when energised, to move the indexing element into engagement with the next adjacent indentation, a thermostat having a plurality of pairs of normally-open switch contacts adapted to close at respectively different temperatures and one of each pair of which is connected to a respective one of said fixed contacts of said rotary switch; said solenoids and switches being connected in circuit with said pump motor and said heater to said electricity supply the arrangement being such that, in operation the multi-position switch is first set manually to a position to select said first pair of thermostat contacts and the machine is thereafter automatically controlled by said control system to automatically execute a washing cycle comprising a first stage in which said water inlet valve is opened and fresh water is admitted to the sump and when the water attains a predetermined level said water-level responsive switch is actuated and the heater and the motor are brought into operation until the temperature within the machine attains the predetermined value at which said first pair of thermostat contacts are actuated, the motor and the heater are switched off and the outlet valve is opened to drain the water from the machine and the multi-position switch is indexed to its next position to select the second pair of thermostat contacts to initiate the next stage of the cycle, in which said outlet valve is closed and said inlet valve is opened and fresh water is admitted to the sump and when the water attains the aforesaid level said water level responsive switch is actuated and the heater and the motor are brought into operation until the temperature within the machine attains the predetermined value at which said second pair of thermostat contacts are actuated the motor and the heater are switched off and the outlet valve is opened to drain the water from the machine and the multi-position switch is indexed to its next position and so on, each pair of thermostat contacts being successively brought into operation until the rotary switch is finally turned to a position to terminate the cycle.

References Cited by the Examiner

UNITED STATES PATENTS

| | | | |
|---|---|---|---|
| 1,995,635 | 3/35 | Clark | 134—57 |
| 2,151,354 | 3/39 | Osuch | 134—57 X |
| 2,155,868 | 4/39 | Pauly et al. | 134—57 |
| 2,254,269 | 9/41 | Clark et al. | 134—57 |
| 2,542,830 | 2/51 | Newton et al. | 134—57 X |
| 2,626,620 | 1/53 | Smith | 134—108 X |
| 2,701,574 | 2/55 | Hollerity | 134—95 X |

CHARLES A. WILLMUTH, *Primary Examiner.*